INVENTORS
John R. Lembke
Tracy W. Nininger
John J. Shea
BY

Attorney

June 27, 1967   J. R. LEMBKE ET AL   3,328,512
ELECTRICAL CABLE ASSEMBLIES
Filed May 20, 1965   2 Sheets-Sheet 2

INVENTORS
John R. Lembke
Tracy W. Nininger
John J. Shea
BY

Attorney

United States Patent Office 3,328,512
Patented June 27, 1967

3,328,512
ELECTRICAL CABLE ASSEMBLIES
John R. Lembke, Overland Park, Kans., and Tracy W. Nininger and John J. Shea, Kansas City, Mo., assignors to the United States of America as represented by the United States Atomic Energy Commission
Filed May 20, 1965, Ser. No. 457,539
5 Claims. (Cl. 174—72)

ABSTRACT OF THE DISCLOSURE

An electrical conductor assembly including a plurality of insulated electrical conductors enclosed within a polyurethane sleeving and projecting beyond the sleeving to an electrical connector, a sheath extending around and overlapping the sleeving and conductors, encapsulating material filling the sheath and the open end of the sleeving, a plastic barrier over the end of the sleeving between the conductors and a removable venting means passing therethrough to prevent wicking of the encapsulating material into the sleeving and a similar assembly for encapsulating a junction of said conductors into a plurality of branches and the method for making the assemblies.

The present invention relates generally to electrical cable assemblies and the fabrication thereof, and more particularly to such assemblies in which individually insulated electrical conductors grouped into a bundle are coupled to an electrical connector and encapsulated or divided at a junction into a plurality of smaller bundles and the junction encapsulated.

An object of the present invention is to provide new and improved electrical cable assemblies and method of fabrication.

Another object of the present invention is to provide new and improved encapsulated electrical cable junctions and encapsulated unions of electrical cables with electrical connectors.

Another object of the present invention is the elimination of permanent molds for electrical cable junctions for facilitating design changes and reducing production lead time and over-all cost.

A further object of the present invention is to provide encapsulated electrical cable assemblies wherein encapsulating material is prevented or inhibited from flowing along conductors in an objectionable manner.

A still further object of the present invention is to provide encapsulated electrical conductor assemblies which are easily manufactured at low cost and are environmentally stable.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purposes of illustration and description. The preferred embodiments illustrated are not intended to be exhaustive nor to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

Figure 1:
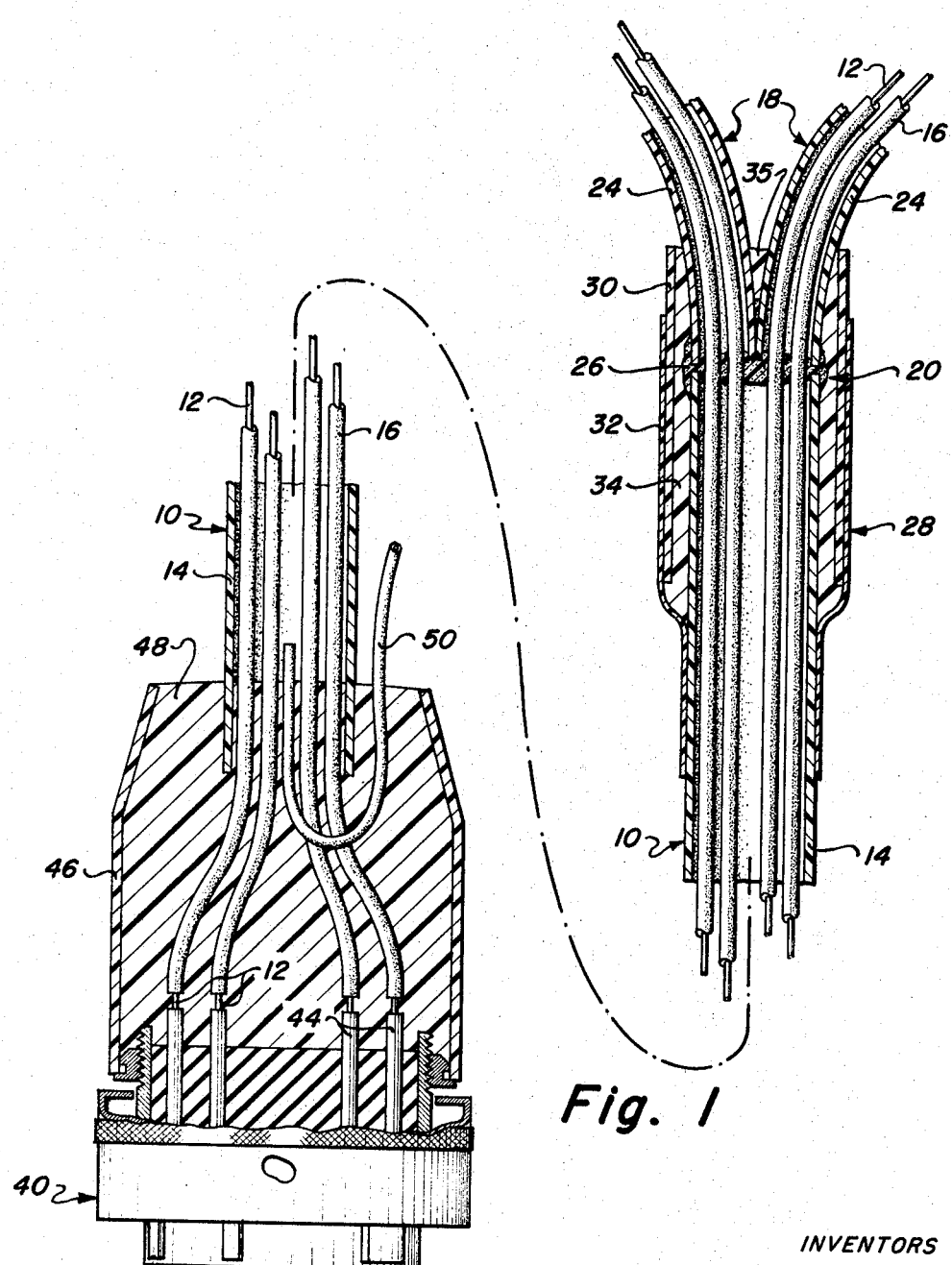
FIG. 1 is a longitudinal sectional view showing the present invention in which a cable assembly is divided into smaller cable units with the junction therebetween encapsulated and in which conductors of the cable assembly are coupled to an electrical connector with the back of the connector encapsulated.

Described generally, the present invention is directed to electrical conductor or cable assemblies where a plurality of individually insulated electrical conductors are grouped into a bundle and covered with a sleeve of plastic material. In one form of the invention the bundle of electrical conductors is divided into smaller bundles or branches with the junction between the bundles being encapsulated and in the other forms the bundle of electrical conductors is joined to electrical connectors and encapsulated. The same novel results are attained with each form in that a stable environmental seal is provided by the encapsulating material at the cable junction and at the back of the connectors with the encapsulating material about the junction being restricted to portions of the cable assembly outside of or beyond the confines of the sleeve of plastic material and with at least one form of the cable-connector assembly to a height or level not greater than that of the encapsulating material on the outer surface of the sleeve. In other words, in each form the encapsulating material is prevented or inhibited from "wicking," i.e., being drawn by capillary attraction or otherwise along the conductors within the plastic sleeve. The wicking of the encapsulating material into spaces underlying the sleeve is contributed to during fabrication of the cable assembly in that the assembly is preferably preheated immediately prior to the addition of the encapsulating compound to assure that the latter "free-flows" and that all surfaces are adequately "wetted"; this preheating expands the air or gas within the sleeving so that when the sleeving cools after encapsulating, the pressure of the air trapped within the sleeving drops to less than ambient pressure and "draws" the still liquid encapsulating material into the sleeve. Other undesirable passage or flow of encapsulating material into the interior of the sleeve may be attributed to the orientation of the assembly during encapsulation or the pressures used during injection molding.

The prevention or minimization of wicking or other undesirable flow or infusion of the encapsulating material into spaces underlying the cable sleeve is advantageous since the portion of the cable subjected to more than moderate infusion tends to become less flexible and effects an objectionable property in the cable in that if it is bent near the point of encapsulation the lesser flexibility of the cable portion infused with the encapsulating material beyond this point may cause excessive force or strain upon the bond between the encapsulating material and the plastic sleeve or connector as to damage or otherwise affect the environmental seal. On the other hand, if no or minimal encapsulating material is present within the plastic sleeve the latter and the encapsulating material remain quite flexible so that the bond between them is not subjected to undue strain when the cable is bent.

In the description of the cable assemblies hereinafter set forth the sleeves encircling the conductor bundles and the encapsulating material may be of any suitable plastic materials but preferably the sleeves are of polyurethane while the encapsulating or potting material is a polyurethane prepolymer. These particular plastic materials are preferable for several reasons, for example, the encapsulating material is closely related to the sleeving material such that the encapsulating material adheres to the sleeving quite tenaciously. In order to assure the attainment of this desirable bond it is preferable to clean all surfaces contacted by the polyurethane potting material or the polyurethane sealant as will be described below. Satisfactory cleaning of these surfaces may be achieved by using a soft brush to apply a cleaning solution comprising 50 percent alcohol and 50 percent toluene. Another significant reason for the preferred selection is that other sleeving-encapsulating combinations such as polyurethane prepolymer-neoprene and neoprene-epoxy have been felt to be not as completely reliable.

With reference to FIG. 1 there is shown an electrical cable assembly 10 comprising a plurality of conductors 12 grouped into a bundle and covered with a polyurethane tubulation or sleeve 14. While four conductors are shown in the sleeve 14 for clarity of illustration, it is to be understood that there may be any desired number of conductors in the sleeve, which number may be less than or greater than the four conductors shown. Each conductor may be provided with a covering 16 of insulating material which may be of any suitable plastic but preferably a plastic material compatible with the polyurethane encapsulating material. At some point along the length of the cable 10, which point may be selected for a particular cable use, the sleeve 14 is circumferentially severed so that the main cable 10 or trunk may be divided into a desired number of smaller cable units or branches 18 such as to form a junction 20 at the point of division with a selected number of conductors 12 being disposed in each of the branches 18. For purposes of clarity only two such branches 18 are shown but there may be any desired number of branches each containing a similar or different number of conductors.

The tubulation or sleeve 14 encircling the conductors 12 forming the main cable or trunk 10 is preferably terminated at or closely adjacent to the point of junction 20 where the conductors began their initial divergence into the cable branches 18, thus enabling each of the branches 18 to be provided with its own polyurethane sleeve 24. The ends of these sleeves 24 may, in turn, be placed in a contiguous or abutting relationship with the end of the sleeve 14 of the cable 10. It will be understood that the conductors are disposed in close contiguity to each other within the sleeves 14 and 24 and are maintained in such relationship by the sleeves.

When the sleeves 14 and 24 are positioned in their contiguous or abutting relationship the junction 20 may be encapsulated without the above mentioned wicking or other infusion of the encapsulating material by providing a suitable seal over the exposed portions of the conductors or underlying the point of abutment between the sleeves 14 and 24 so as to prevent the subsequently poured or injected encapsulating material from running or being attracted into the cable sleeving during and subsequent to the encapsulating operation. A satisfactory seal may be provided by a suitable paste-like plastic material such as a polyurethane prepolymer having about four percent of a filler such as high surface silicon dioxide or other suitable filler material to control the flow of the material. This seal of plastic material as shown at 26 preferably extends across the ends of the sleeves and fills the entire cross-sectional area within the sleeves 14 and 24 except the area occupied by the conductors so as to form a sleeve closure or barricade on a plane generally common with the ends of the sleeves 14 and 24. The seal 26 is preferably disposed around the circumference of the sleeve 14 and each of the sleeves 24 and extends along outer surface portions of the sleeves 14 and 24 adjacent the ends thereof to interconnect the sleeves and assure that the sleeves 24 are joined together where the latter converge into or approach a contacting relationship with each other and the sleeve 24, thus preventing the passage of encapsulating material into the interior of the sleeve. The paste-like seal 26 may be subjected to heat from a hot air gun or the like immediately after the application thereof to provide it with a smooth surface. Inasmuch as the plastic material forming the seal 26 is substantially the same as the polyurethane material forming the sleeves, an excellent bond is provided between the seal and the sleeves upon the curing of the paste-like seal, which curing may, for example, be achieved entirely at room temperature or preliminarily at room temperature followed by elevated temperatures for a shorter duration. Thus, with the seal 26 overlapping the joints between the sleeve 14 and sleeves 24 and interconnecting the adjacent sleeves 24 it is preferable but not critical that the unoccupied cross-sectional areas within the sleeves be entirely filled with the seal 26 or that a bond be formed between the seal and the coverings 16 on the conductors.

In order to encapsulate the junction 20 after the seal 26 is in place and properly cured, an entubulating structure or casing 28 may be placed about the junction 20 to provide a mold or receptacle of a desired configuration. The novel mold of the present invention may comprise a short length of plastic tubing 30 preferably of polyurethane and having a diameter greater than the diameter of the sleeve 14 such that the tubing 30 overlaps the point of contact between the sleeves 14 and 24 a desired length, such as, for example, about 0.5 of an inch or more in either direction. A portion of the tubing 30 is, in turn, encircled with a jacket 32 of plastic material that preferably overlaps the end of the tubing 30 encircling the sleeve 14 and extends along the sleeve 14 a sufficient distance so that the portion of the jacket 32 overlying the sleeve 14 may be secured in a fluid tight manner to the sleeve 14. The portion of the jacket encircling the tubing 30 may extend therealong any desired length, for example, slightly overlapping the point of contact or abutment between the sleeves 14 and 24 as shown. The jacket 32 is preferably of a heat shrinkable material, such as, for example, irradiated polyolefin so that upon application of heat from a suitable source such as a hot air gun or other suitable means, the portions of the jacket 32 extending beyond and over the tubing 30 may be shrunk onto the surface of the sleeve and tubing respectively, to provide fluid tight seals therewith. After the tubing 30 and jacket are in place the assembled components may be preheated in a suitable oven or other heating means to facilitate proper bonding with the encapsulating material as described above. After preheating the branches 18 may be spread apart so as to bear against the tubing 30 for centering the latter while providing a suitable opening for introducing the encapsulating material into the empty volume within the tubing and jacket.

The encapsulating material shown at 34, which may be de-aerated under vacuum during the mixing thereof to minimize or control air or gas bubbles in the encapsulated product, may be poured or injected into the casing 28 by vertically orienting the cable such that the cable trunk 10 is below the branches 18, thus providing a suitable receptacle for the encapsulating material 34. As shown in FIG. 1 the encapsulating material covers the seal and adjacent portions of the sleeves to provide sufficient bonding area for assuring the attainment of adequate environmental sealing.

Upon completion of the encapsulating operation the branches 18 may be spread apart if not previously done or again, if necessary, to allow the encapsulating material to form a stress relieving fillet 35 intermediate the sleeves 24. Also, after the encapsulating material is cured, the jacket 32 may be cut away or otherwise removed to provide a junction assembly the parts of which are securely bonded to each other.

Figure 2:
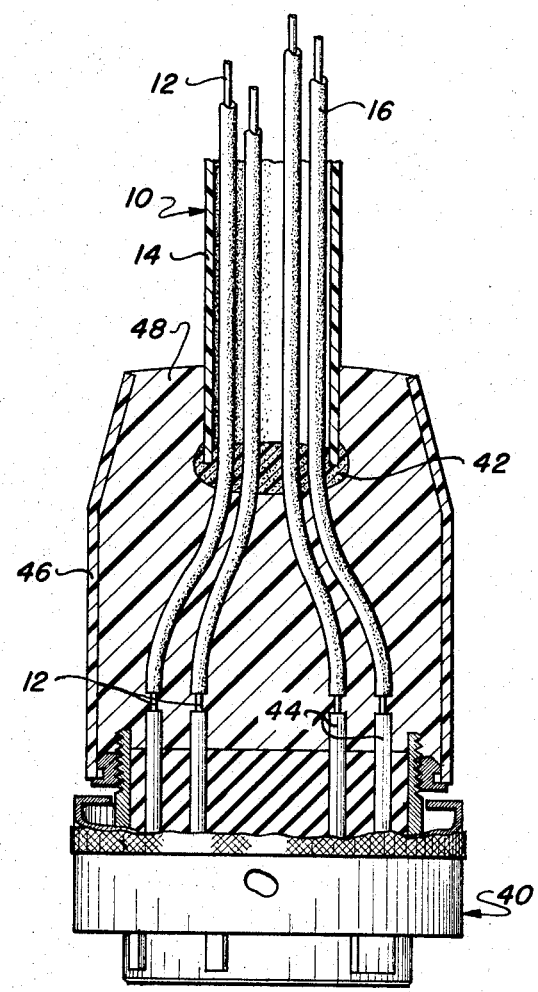
FIG. 2 is a longitudinal sectional view showing conductors joined to an electrical connector and the back of the connector encapsulated.

FIG. 2 shows the novel paste-like polyurethane seal being used with an electrical connector 40 wherein encapsulating material is used to provide an environmental seal between an electrical cable and the connector. In this arrangement a paste-like seal 42 of plastic material similar to that of the seal 26 is provided at the leading end of a sleeve (shown with sleeve 14 for ease of illustration and description) with the seal 42 completely covering the unoccupied area of the "open" end of the sleeve as to provide a barrier against the passage of encapsulating material into the sleeve. Like the seal 26, the seal 42 preferably overlies an outer surface portion of the sleeve 14 to prevent the passage of encapsulating material between the seal 42 and the end of the sleeve 14.

When the seal 42 is in position, which may be either before or after the conductors 12 extending from the sleeve 14 are coupled to the contact pins 44 of the connector 40 in a customary fashion such as soldering or the like, a "boot" or potting mold 46 may be positioned on the connector 40. This boot 46, which is preferably of polyurethane but may be of any other suitable plastic material such as nylon, should be of a sufficient length as to overlap the end of the sleeve 14 and be of a diameter substantially greater than that of the sleeve to provide adequate space for the reception of the encapsulating material 48. The boot may overlap the end of the sleeve 14 about 0.125 of an inch or about 0.25 of an inch for mechanically stressed cables. Also, the boot 46 should "fit" against the connector body in a fluid tight manner as to prevent escape of the encapsulating material. With the boot 46 in place against the connector, the cable and connector are vertically oriented with the connector being disposed below the cable so as to provide an open receptacle into which the encapsulating material 48 may be readily poured or injected. It may be preferable to preheat the connector, boot and cable to assure a proper bond of these components with the encapsulating material as described above.

The particular electrical connector 40 illustrated forms no part of the present invention in that any commercially available connector may be used with satisfactory results.

Again referring to FIG. 1, there is shown a form of the present invention which is capable of minimizing undesirable flow of encapsulating material to spaces within the cable sleeving when the conductors are coupled to contact pins 44 of an electrical connector 40 and encapsulated. This form of the invention may also be used with either the sleeves 14 or 24 but is shown with sleeve 14 for ease of illustration and description. A connector assembly similar in all respects to the above described connector assembly except for the omission of the seal 42 may be used with this form of the present invention. A small tube 50 of plastic material such as nylon or the like is utilized. This tube is preferably installed prior to the injection or pouring of the encapsulating material 48 so that one end of the tube extends into the sleeve 14 through the open end thereof while the other end of the tube projects from the boot 46 as to provide open communication to or an air vent for the interior of the sleeve 14 thorugh the tube 50. The tube portion within the sleeve 14 preferably projects to location beyond the intended height of the encapsulating material as determined by the height of the boot 46 as shown in FIG. 1. Thus, the tube 50 permits the balancing of the pressures inside and outside the sleeve 14 so that the encapsulating material 48 is inhibited or prevented from being drawn up into the sleeve 14 beyond the level of the encapsulating material determined by the boot 46. Before the encapsulating material takes a permanent set such as during the initial jelling stages after the assembled components cool to about room temperature, the tube 50 may be removed thereby enabling the void caused by removal of the tube to be easily filled with the encapsulating material 48. Another manner of interrupting the air vent through the tube 50 may be to terminate the tube at a point underlying the boot 46 and thereafter filling the tube and the void formed by the removed portion of the tube with encapsulating materail.

Figure 3:
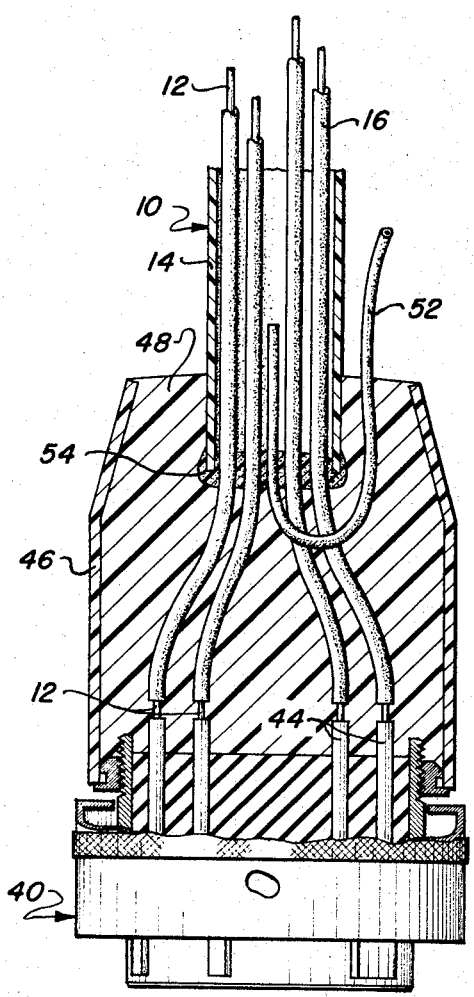
FIG. 3 is a sectional view showing conductors joined to an electrical connector and the back of the connector encapsulated.

In FIG. 3 there is shown an electrical cable coupled to an electrical connector and encapsulated by using both an air pressure balancing tube 52 similar to air tube 50 in FIG. 1 and a paste-like plastic seal 54 similar to seal 42 in FIG. 2 to inhibit undesirable flow of encapsulating material into unoccupied spaces within the cable sleeving. For convenience of description and ease of illustration this form is shown with cable sleeve 14 and a connector assembly similar to the connector assemblies shown in FIGS. 1 and 2.

When using both the air balancing tube 52 and the paste-like seal 54 it may be preferable to place the tube 52 into the cable sleeve 14 prior to applying the seal 54. The installation and subsequent removal or plugging of the tube 52 and the application of the seal 54 may be effected similarly to the procedures described above with respect to the tube 50 and the seal 42 respectively.

In this form of the invention, the air tube 52 and seal 54 together provide for the prevention or inhibiting of undesirable flow of the encapsulating material into the sleeve 14 in that if the paste-like seal 54 does not provide an adequate sleeve closure then the tube 52 balancing the pressures within and without the sleeve functions to inhibit the undesirable flow. Conversely, if the tube 52 for some reason does not achieve desired air pressure balancing then the seal 54 functions to prevent the undesirable flow.

If desired, an air tube similar to tube 52 may be used in conjunction with the barrier 26 in the junction assembly of FIG. 1 to further assure that undesirable flow of the encapsulating compound does not occur.

In each of the above embodiments it may be desirable to allow the encapsulated assembly to stand at room temperature for about 12 hours after the potting or encapsulating step to allow the encapsulating material to begin jelling to reduce the possibility of trapping bubbles in the material. The encapsulating material may then be oven cured at a temperature of, for example, about 160° F. for about 4 hours or about 250° F. for about 45 minutes. Curing can also be achieved at room temperature but this may require longer times, e.g., about 7 days. However, if the cable assembly may be subjected to mechanical stresses at elevated temperatures during use, it may be preferable to use a cure temperature about the same as the maximum temperature of the environment to which the cable will be subjected, thus increasing the mechanical strength of the bond at that temperature.

Oftentimes air and other gaseous products are trapped within the encapsulating material and forms bubbles or voids in the encapsulation. These bubbles are highly objectionable from an environmental sealing standpoint and should be removed prior to the permanent set of the encapsulating material. A satisfactory procedure for removing the bubbles is to insert a hollow needle with an attached syringe (not shown) into the encapsulating material immediately after the pouring thereof and using the syringe to draw the bubble into the hollow needle. This procedure eliminates the need for vacuum degassing after the encapsulating operation.

It will be seen that the present invention provides a substantial savings over previous procedures in that permanent molds for cable junctions and other significant tooling are not required. Also, various changes may be made to the product without requiring extensive modification of the procedure.

As various changes may be made in the form, construction and arrangement of parts herein without departing from the spirit and scope of the invention and without sacrificing any of its advantages, it is to be understood that all matter herein is to be interpreted as illustrative and not in a limiting sense.

We claim:
1. The method of encapsulating an electrical cable assembly having a plurality of electrical conductors disposed in side-by-side relationship and electrically isolated from each other within a length of plastic sleeving, comprising the steps of terminating the sleeving at a preselected location on said conductors, dividing said conductors into a plurality of conductor units adjacent the termination of said sleeving, encircling each conductor unit with a plastic sleeve, positioning an end of each of said plastic sleeves in close contiguity to the terminated end of the sleeving, interconnecting the contiguous ends of the sleeves and sleeving and filling the unoccupied cross-sectional areas therein adjacent said ends for isolating the interior of said sleeves and sleeving from infusion of encapsulating material, enclosing the junction between the sleeves and sleeving by loosely entubulating the junction and adjacent portions of the sleeves and sleeving and further entubulating the portion of the sleeving and an other adjacent portion thereof and deforming the further entubulation to grip said other adjacent portion for defining a receptacle to retain said encapsulating material, and thereafter filling unoccupied volumes within the receptacle with plastic encapsulating material.

2. The method of encapsulating an electrical cable assembly having a plurality of electrical conductors disposed in side-by-side relationship and electrically isolated from each other within a length of plastic sleeving with end portions of said conductors projecting from an open end of the sleeving and coupled to contact pins on the back side of an electrical connector, said method comprising the steps of venting the interior of the sleeving through said open end to ambient air pressure to maintain air pressures on either side of said sleeving essentially balanced during encapsulation to inhibit wicking of the encapsulating material into spaces within the sleeving, enclosing the end portions of the conductors and a portion of the sleeving to form a housing thereabout, preheating the assembled components, thereafter filling the housing with plastic encapsulating material, and interrupting the venting of the sleeving interior subsequent to the filling of the housing with encapsulating material and resealing the conductors and the sleeving adjacent the end thereof subsequent to venting to isolate the conductors and adjacent empty volumes within the sleeving from the atmosphere.

3. An electrical conductor assembly of the character described comprising in combination a plurality of electrical conductors electrically isolated from each other, an elongate polyurethane sleeving encircling said conductors with portions of the latter projecting beyond an open end of the sleeving, the conductor portions projecting from the open end of sleeving divided into a plurality of branches with each branch containing a preselected number of conductors, a plastic sleeve encircles the conductors of each branch with an open end of each plastic sleeve disposed in close contiguity with said open end of the sleeving, a plastic sheath disposed about said conductors, sleeving, and said sleeves in an overlapping relationship with said sleeving and sleeves adjacent said open ends and said conductor portions, a polyurethane prepolymer encapsulating compound covering said sleeving and sleeves at locations underlying said sheath, and a plastic barrier of polyurethane prepolymer with a filler material bonded to said sleeving and sleeves in close proximity to said open ends thereof and filling cross-sectional areas within the sleeving and sleeves on a plane generally common with said open ends of the sleeving and sleeves for closing the latter except for the conductor portions projecting therethrough and for inhibiting disposition of the encapsulating compound within unoccupied volumes of the sleeving and sleeves for any substantial distance beyond the confines of the plastic sheath.

4. An electrical conductor assembly of the character described comprising in combination a plurality of electrical conductors electrically isolated from each other, an elongate polyurethane sleeving encircling said conductors with portions of the latter projecting beyond an open end of the sleeving and coupled to contact pins of an electrical connector disposed adjacent to said end of the sleeving, a plastic sheath disposed about said conductors and said sleeving in an overlapping relationship with said sleeving adjacent said end and said conductor portions, a polyurethane prepolymer encapsulating compound covering said conductor portions and said sleeving at locations underlying said sheath, and plastic means including a plastic barrier of polyurethane prepolymer with a filler material covered by said encapsulating compound and bonded to said sleeving in close proximity to said end thereof and filling cross-sectional areas within the sleeving on a plane generally common with said open end of the sleeving for closing the latter except for the conductor portions projecting therethrough and including an elongate plastic tube with one end portion thereof projecting through said barrier and terminating within said sleeving and an other end portion of the tube projecting through the encapsulating compound intermediate the sleeving and the sheath and terminating at a location beyond the confines of the latter for inhibiting disposition of the encapsulating compound within unoccupied volumes of the sleeving for any substantial distance beyond the confines of the plastic sheath.

5. An electrical conductor assembly of the character described comprising in combination a plurality of electrical conductors electrically isolated from each other, an elongate polyurethane sleeving encircling said conductors with portions of the latter projecting beyond an open end of the sleeving, a plastic sheath disposed about said conductors and said sleeving in an overlapping relationship with said sleeving adjacent said end and said conductor portions, a polyurethane prepolymer encapsulating compound covering said sleeving at locations underlying said sheath, and an elongate plastic tube with one end portion thereof disposed within said sleeving and terminating at a location beyond the confines of the plastic sheath and an other end portion of the tube projecting from the open end of the sleeving through the encapsulating compound intermediate the sleeving and the sheath and terminating at a location beyond the confines of the sheath for inhibiting disposition of the encapsulating compound within unoccupied volumes of the sleeving for any substantial distance beyond the confines of the plastic sheath.

References Cited

UNITED STATES PATENTS

| 2,938,941 | 5/1950 | Roberts | 174—77 X |
| 3,015,794 | 1/1962 | Kishbaugh | 174—77 X |

FOREIGN PATENTS

| 873,854 | 7/1961 | Great Britain. |

LARAMIE E. ASKIN, *Primary Examiner.*